April 3, 1962 — R. H. BAIN — 3,027,583

DRINKING GLASS WASHERS

Filed May 23, 1960 — 2 Sheets-Sheet 1

Robert H. Bain
Inventor

April 3, 1962     R. H. BAIN     3,027,583

DRINKING GLASS WASHERS

Filed May 23, 1960     2 Sheets-Sheet 2

Robert H. Bain
Inventor 3,027,583
DRINKING GLASS WASHERS
Robert H. Bain, P.O. Box 357, Longview, Wash., assignor of 45.08 percent to Roger Crandall, 23.46 percent to Jack Errand, and 23.46 percent to Ralph V. Andersen
Filed May 23, 1960, Ser. No. 31,154
1 Claim. (Cl. 15—164)

My invention relates to drinking glass washers and has for its principal objective a more thorough and faster cleansing of said glasses.

My invention is useful in hotels, restaurants, clubs, taverns, and soft drink parlors, where drinking glasses are constantly being used and must be washed many times a day. Most state authorities require that a glass once used must be washed and rinsed both inside and outside.

Washing costs run into considerable money in the above mentioned establishments. These costs I have reduced to the minimum with my invention which is illustrated in the accompanying drawings.

Figure 1:
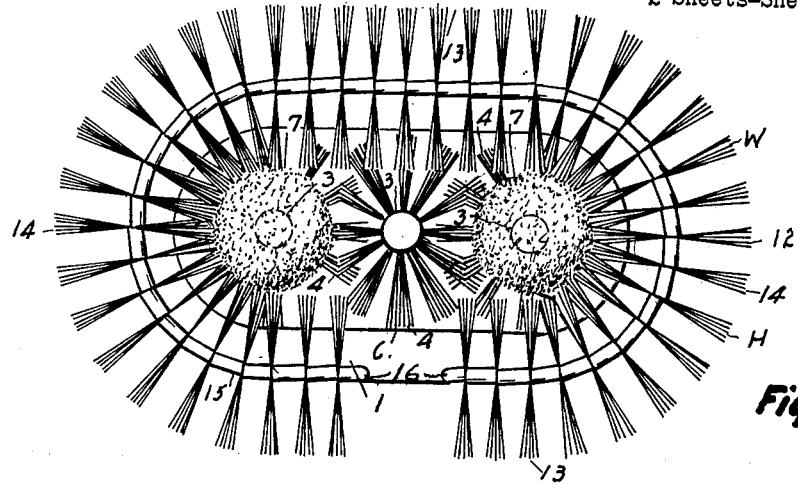
Figure 2:
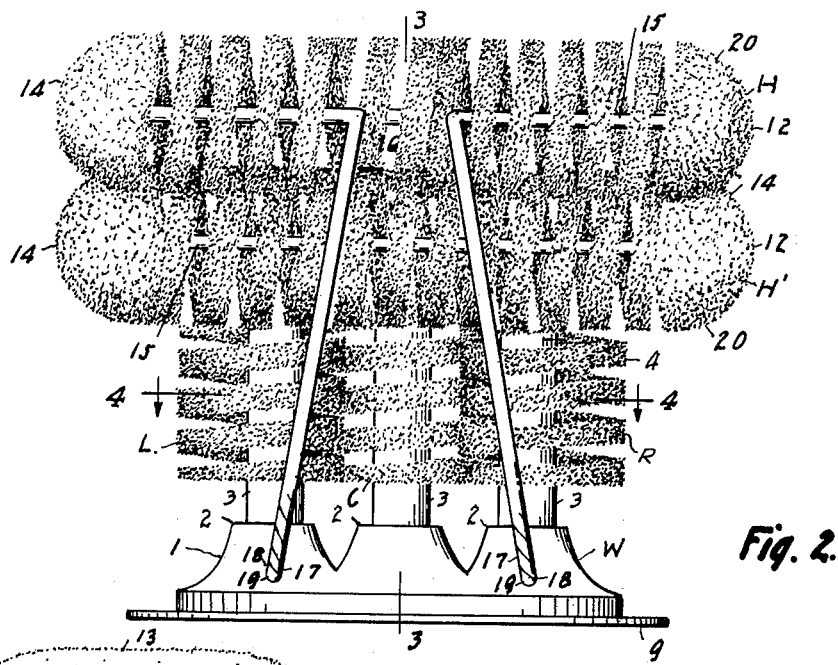
Figure 7:
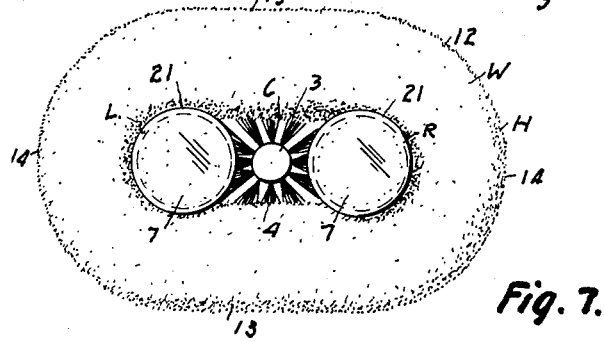
Figure 3:
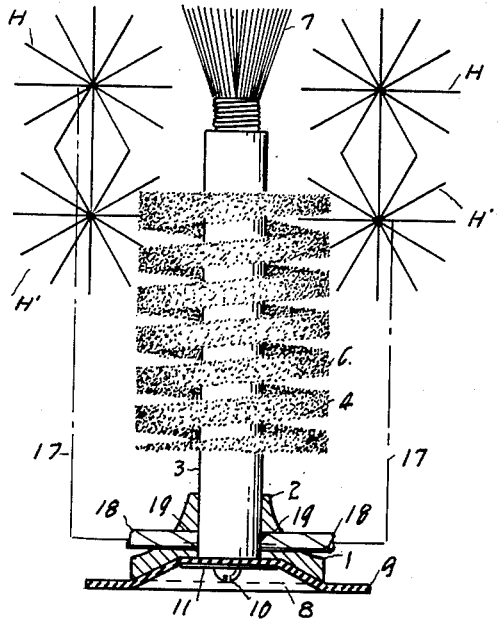
Figure 4:
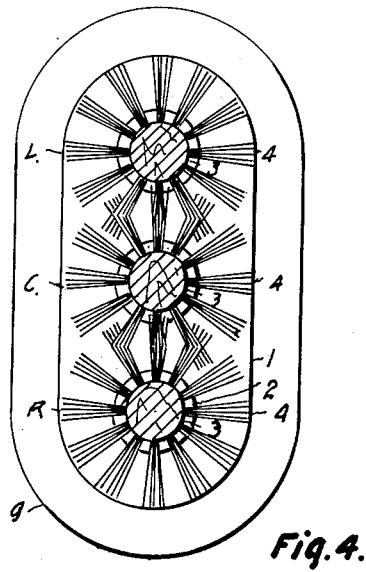
Figure 8:
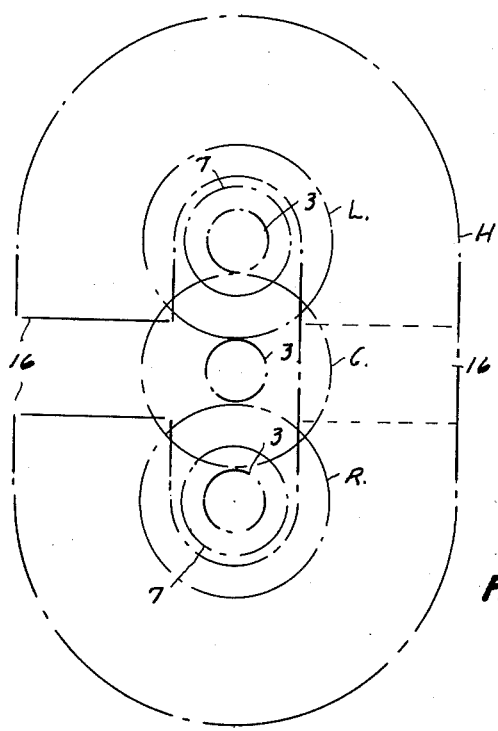
Figure 6:
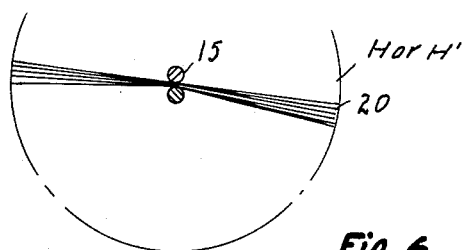
Figure 5:
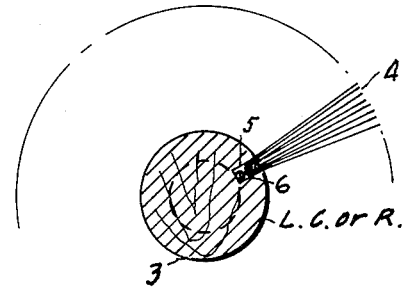

FIG. 1 of the drawings is a top plan view of the washer; FIG. 2 is a side elevation; FIG. 3 is a vertical section on the line 3—3 of FIG. 2; FIG. 4 is a horizontal section on the line 4—4 of FIG. 2; FIG. 5 is a horizontal section through a vertical brush; FIG. 6 is a vertical section through a horizontal brush; FIG. 7 is a diagrammatic drawing showing the working relation between the brushes and glasses being cleansed; FIG. 8 illustrates the overlapping relation of adjacent brushes.

Throughout the drawings and the specification similar numerals refere to similar parts.

The washer W includes a cast or extruded base portion 1 of metal or plastic provided with three sockets 2 formed for the reception of the cylindrical wood cores 3 which support the bristles 4 of the vertically disposed cylindrical brushes L, C, and R. Each of these three brushes are 3" in diameter and 4" long and are in alignment on 2" centers which fact allows for wear and considerable latitude in the diameter of the glassware being worked upon. The core 3 of a vertical cylindrical brush is formed with a spiral groove 5 for the reception of the double-wire bristle grip 6 commonly used and understood by manufacturers of cylindrical brushes. Supported on the top of each core 3 is a tuft of bristles as 7 whose function will be described in due time. The cores 3 are made a snug fit in their respective sockets 2 which terminate short of the bottom of the base portion 1 to leave a recess 8 adjacent each core. A soft rubber gasket or pad 9 is secured to the bottom of each core 3 by means of the screw 10 and washer 11 as shown in FIG. 3. This soft rubber pad 9 extends beyond the base portion 1 as shown in FIGS. 3 and 4 and helps form a suction cup device adapted to hold the washer W from moving about in a sink full of wash water (not shown).

The horizontal brushes H and H' are positioned one above the other as shown in FIG. 2 and around the vertical brushes L, C, and R, as shown in FIG. 1. The horizontal brushes H and H' are formed as an open loop 12 with parallel sides 13 and semi-circular ends 14 said loop 12 having outside dimensions of approximately 7" x 11" with a brush diameter of 2½". The construction of the horizontal brushes H and H' is similar to the construction of the vertical brushes L, C, and R, except that a wire of much heavier gauge is used for the bristle grip 15 because this grip 15 is extended beyond the bristle ends as at 16 and is bent downwardly to form the supporting legs 17 the lower end 18 of which is bent at right angles to enter the aperture 19 provided to receive it in the core socket 2. The legs 17 supporting the horizontal brush H are positioned on one side of the loop 12 while the legs 17 supporting the horizontal brush H' are positioned on the opposite side of said loop 12 as shown in FIG. 3.

When formed and positioned as I have described the "nylon" bristles 4 of the vertical brushes L, C, and R, overlap not only each other but the "nylon" bristles 20 of the horizontal brushes H and H'. See FIG. 8 in particular.

In practice the operator of my washer W uses both hands simultaneously. In other words, he washes two glasses at a time. He places glasses 21 over the vertical brush L and the vertical brush R moving them up and down without twisting them thus saving considerable time.

In these times the use of lip stick by women presents a real problem. It is not easy to remove lip stick from glasses, but by the use of my horizontally disposed brushes H and H' I can present twice the bristle surface to the task and do a job.

While I have used "nylon" for the bristles for my brushes I am aware that other fibers may suffice. It is apparent too that many changes may be made in my washer especially in the detail construction thereof without departing from the basic idea of using the three vertical brushes in combination with one or more horizontal brushes. Therefore I extend my invention to all that comes fairly within the scope of the appended claim. What is new over the prior art follows.

I claim:

A drinking glass washer having in combination a base structure provided with a suction cup portion and having three spaced apart medially aligned brush support sockets, a cylindrical brush supported in each socket and extending upwardly therefrom the center cylindrical brush being in intimate contact with each of the end brushes each of said end brushes being crowned with a tuft of bristles, and one or more elongated horizontally disposed brushes of circular cross section surrounding all three of the upwardly extending brushes in intimate contact therewith said horizontal brushes being formed with twisted bristle grip wires having end portions adapted to be supported by the base structure.

References Cited in the file of this patent
UNITED STATES PATENTS

| | | |
|---|---|---|
| 2,124,748 | Ransom | July 26, 1938 |
| 2,263,256 | Kapinos | Nov. 18, 1941 |
| 2,768,402 | Back | Oct. 30, 1956 |
| 2,900,653 | Lamberton | Aug. 25, 1959 |